Sept. 11, 1923.
A. HUBALEK
AUTOMOBILE BRAKE
Filed Sept. 1, 1922
1,467,854
3 Sheets-Sheet 2
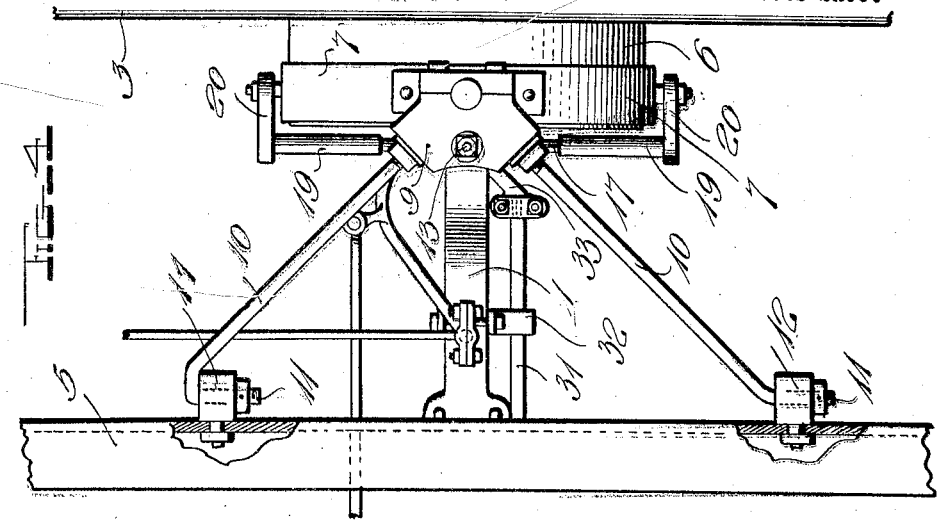
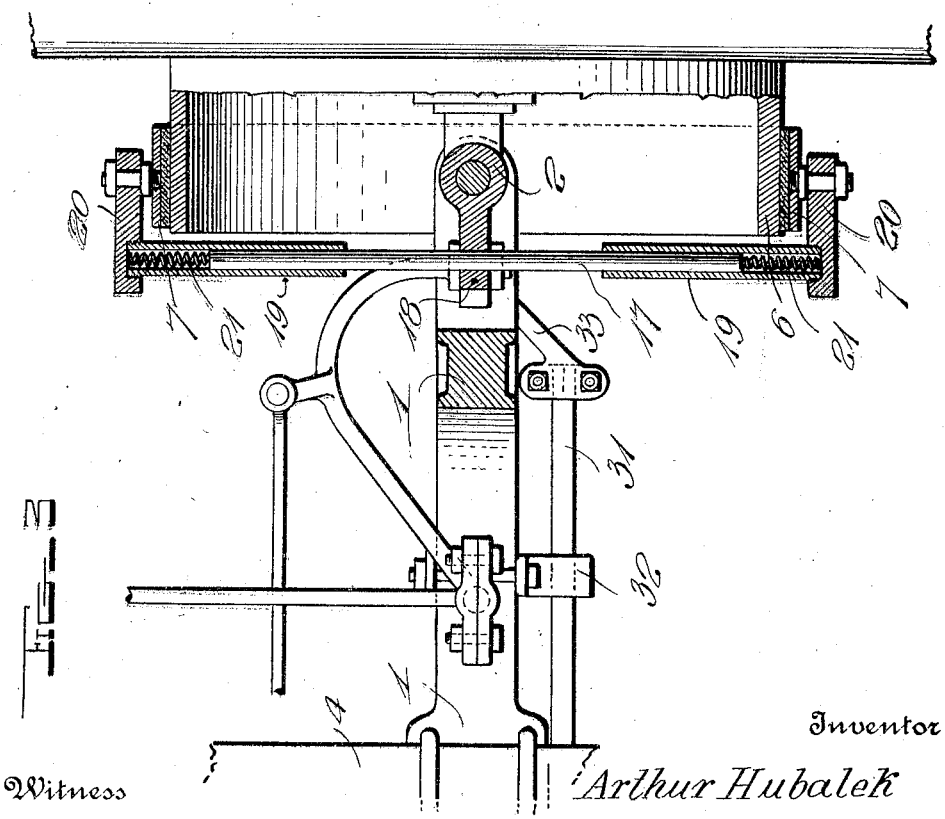
Inventor
Arthur Hubalek
By H. B. Wilson & Co.
Attorneys
Witness Sept. 11, 1923.　　　　　A. HUBALEK　　　　1,467,854
AUTOMOBILE BRAKE
Filed Sept. 1, 1922　　　3 Sheets-Sheet 3
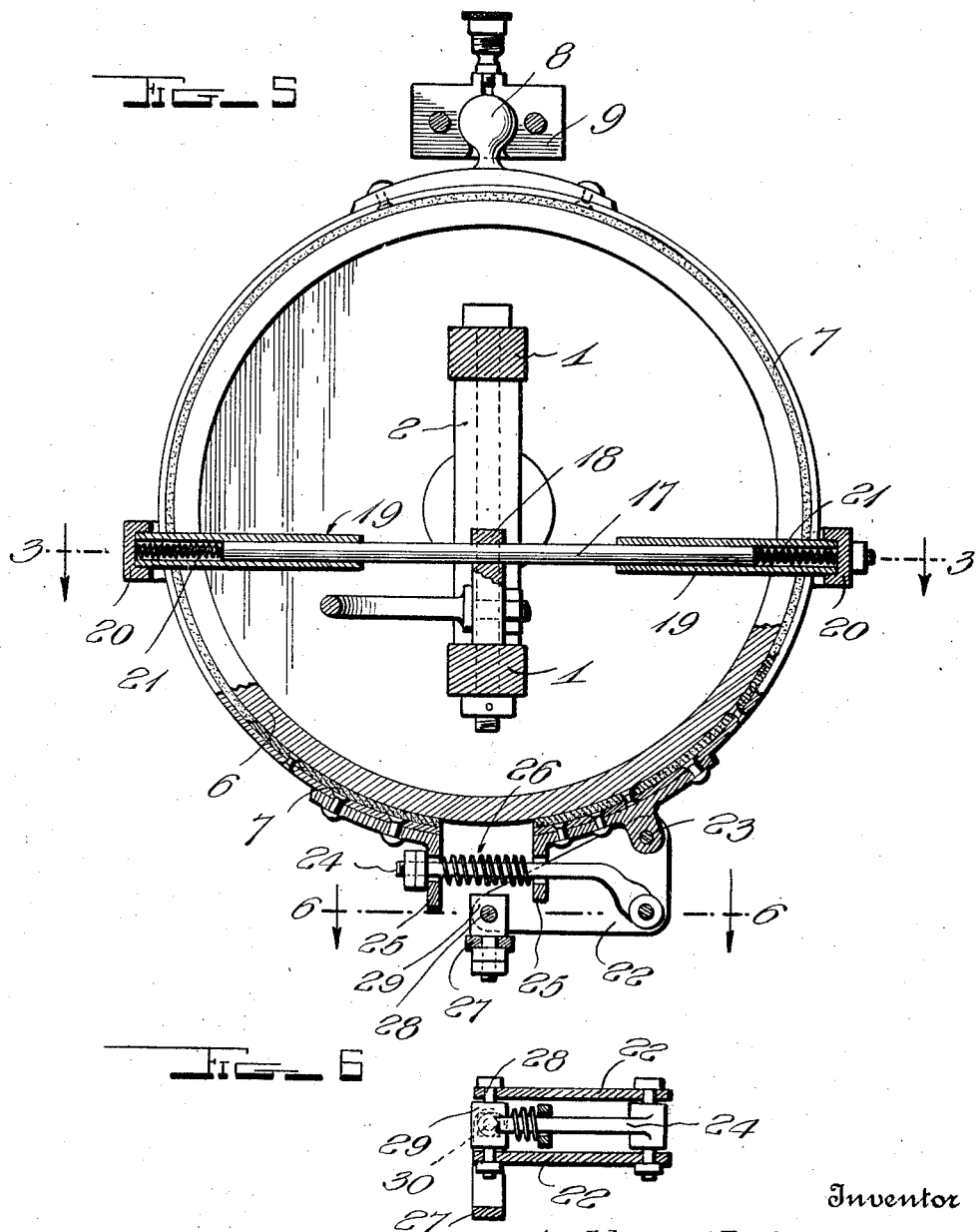
Witness
Inventor
Arthur Hubalek
By
Attorneys Patented Sept. 11, 1923.

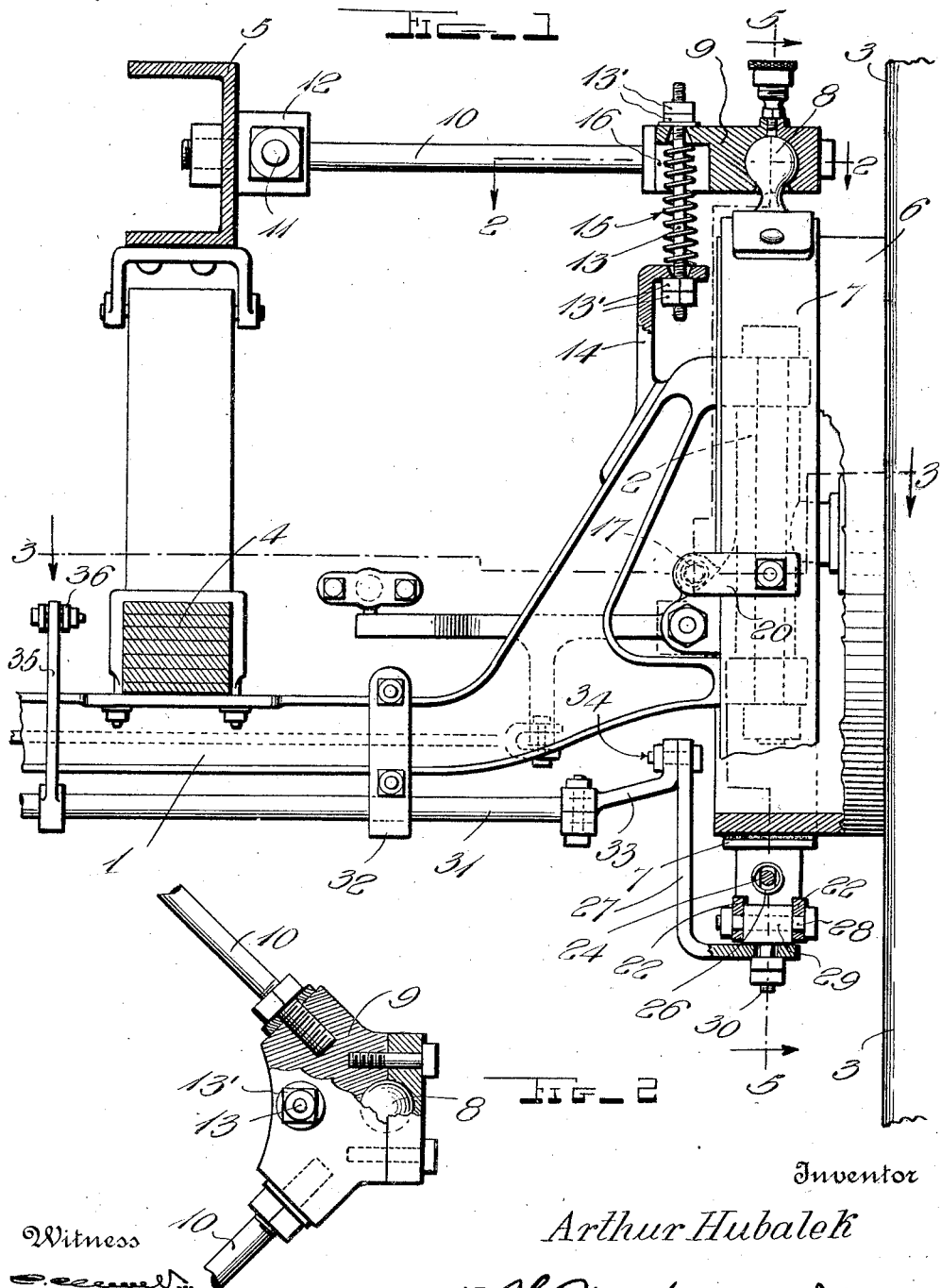

1,467,854

UNITED STATES PATENT OFFICE.

ARTHUR HUBALEK, OF BROOKLYN, NEW YORK.

AUTOMOBILE BRAKE.

Application filed September 1, 1922. Serial No. 585,678.

*To all whom it may concern:*

Be it known that I, ARTHUR HUBALEK, a citizen of the United States, residing at Brooklyn, in the county of Kings and State of New York, have invented certain new and useful Improvements in Automobile Brakes; and I do declare the following to be a full, clear, and exact description of the invention, such as will enable others skilled in the art to which it appertains to make and use the same.

My invention relates to improvements in automobile brakes for use in connection with knuckle carried wheels, being designed primarily for use in connection with the front wheels of the average automobile although it will be understood that it could well be used on all four wheels of any trucks or other machines in which all wheels are driven and steered.

The principal object of the invention is to provide a brake of the character specified mounted in a novel manner upon the automobile, so that the brake drum and shoe may freely turn with the wheel when steering, yet the shoe is positively held against rotating with the drum.

For holding the brake shoe, which is preferably a brake band, against rotation with the drum, I employ a connection between said shoe and some fixed part of the chassis, preferably the ordinary frame, a further object being to provide a pivotal connection such as a ball and socket joint, between the shoe and the part which leads to the frame or the like, said pivotal connection being in vertical alinement with the knuckle pivot, so that the brake shoe is not affected in any manner when turning the wheel and drum for steering purposes.

The connection between the brake shoe and frame, above referred to, is preferably in the form of a radius rod and a further object is to connect this radius rod with the axle of the machine, by some elastic means which insures smooth operation without noise when the rod swings vertically with yielding of the vehicle springs.

Another object of the invention is to provide a unique form of carrier for the brake shoe adapted to be welded or otherwise secured to the steering knuckle and when the brake shoe is in the form of a band, I aim to construct this carrier in such a manner as to cause the same to expand the band when the brake is released.

For operating the brake shoe, I provide suitable means including a vertically movable member at the lower side of the brake drum and a still further object of the invention is to provide a connection between said member and the brake shoe, including a pivot in vertical alinement with the pivot of the steering knuckle, whereby the brake operating mechanism will not be interfered with by and will not interfere with the steering of the machine.

With the foregoing in view, the invention resides in the novel subject matter hereinafter described and claimed, the description being supplemented by the accompanying drawings.

Figure 1 is a front elevation partly in section showing the application of my invention to a portion of an automobile.

Figure 2 is a detail horizontal section on line 2—2 of Fig. 1.

Figure 3 is a horizontal sectional view as indicated by line 3—3 of Fig. 1.

Figure 4 is a plan view.

Figure 5 is a vertical sectional view on line 5—5 of Fig. 1, this view giving also the line 3—3 upon which Figure 3 is taken.

Figure 6 is a detail horizontal section on line 6—6 of Fig. 5.

In the drawings above briefly described, the numeral 1 designates an ordinary front axle of an automobile, 2 designates one of the steering knuckles, 3 has reference to one of the front wheels, 4 indicates the front spring and 5 refers to the chassis frame. All of these parts are well known and are merely illustrated to show the application of my invention.

A suitable brake drum 6 is secured to the wheel 3 in any desired manner and a brake band 7 or other brake shoe cooperates with said drum. I prefer to use a brake band surrounding the drum, but it will be understood that within the scope of the invention, an internal brake of some sort might well be employed. In the form of the invention herein shown, the upper side of the brake band 7 carries a ball 8 received in a sectional socket 9 constituting part of a radius rod, the two arms 10 of this rod being pivoted on horizontal axes as indicated at 11, two suitable bearings 12 adapted to be fixedly mounted on the frame 5 or on any other fixed part of the chassis, if desired. It will be seen that one of the arms 10 extends obliquely forward while the other extends rearwardly in a similar manner from the head 9. Thus, the ball and socket connection between the radius rod and the brake band 7, positively holds said band against any rotation whatever with the brake drum 6. This band is also held against any lateral movement with respect to the frame and it will be seen that the pivot 11 and the ball and socket joint, permit free vertical oscillation of the radius rod, during action of springs 4.

To insure smooth operation of the radius rod, that is free vertical swing thereof during passage of the machine over the road, I provide some suitable elastic connection between the head 9 and the axle 1. Although the elastic connection could be of some other construction, it preferably comprises a bolt 13 which has its opposite ends threaded and extended through apertures in the head 9 and laterally directed end of the bracket 14, nuts 13' being screwed on the threaded ends for the purpose of making the desired or necessary adjustments. Associated with this bolt is a coiled spring 15 which surrounds it, one end thereof bearing on the laterally directed upper end of the aforesaid bracket, and the other end being received in a recess 16 formed in the bottom of the head 9. In practice, the bracket 14 may be welded or otherwise secured on the upper fork arm of the axle. It is obvious that with this arrangement the upper portion of the brake band 7 will be supported against sagging upon the drum, yet effective and tight contraction of the band will be permitted when necessary by the yielding of the spring.

A carrier is provided which is intended to act in conjunction with the aforesaid elastic connection for supporting and expanding the brake band 7. In the present showing, this carrier includes a horizontal rod 17 which is intended to be welded or otherwise secured at 18 to the knuckle 2. Each end of the rod 17 is surrounded by a sliding sleeve 19 which will also rotate to some extent thereon, the ends of the sleeves being provided with lateral arms 20 which are connected with the brake band 7 at diametrically spaced points. Coil springs 21 are interposed between the arms 20 and the ends of the rod 17 to force outwardly on the former, whereby to normally expand the brake band 7. When the lower ends of the brake band are drawn together the band can of course yield inwardly against the drum, due to the action of the springs 21 sliding on the sleeves 19 upon the rod 17, during which movement the band will also yield downwardly to some extent against the action of the spring 16.

The numeral 22 designates a horizontally disposed lever, fulcrumed at 23 to one end of the brake band 7 and connected with the other end thereof by means of a pull bolt 24 which passes through lugs 25 on the band ends and carries a band expanding spring 26. This construction is well known for contracting brake bands and while it is preferable, it will be understood that other methods could be used with equal advantage.

The numeral 27 designates a vertically movable member for operating the lever 22, this member being here shown in the form of an L-shaped bar with one arm underlying the lever 22. This lever is pivoted upon a horizontal axis 28 to a block 29 which is in turn pivoted on a vertical axis 30 to the horizontal end of the bar 27, the pivot 30 being in vertical alinement with the pivot of the knuckle 2 and the vertical axis of the ball 8, so that the portion of the brake mechanism which is movable with the wheel when steering, will not be interfered with and may be operated at any time, regardless of the angular position at which the front wheels stand.

For vertically moving the bar 27, any suitable means may be employed. I prefer however to mount a horizontal rock shaft 31 on the axle 1 in suitable bearings 32 clamped to said axle, the end of said shaft being provided with a crank arm 33 pivoted to the bar 27 as indicated at 34. In the present showing, a crank arm 35 rises from the rock shaft 31 and I have shown a portion of a link 36 pivoted to said arm 35, being adapted to extend rearwardly and connect in any preferred manner with the service brake of the machine or with an independent brake pedal or the like if desired.

In the foregoing, the construction of the invention will be clearly understood and it will be seen that by rocking the shaft 31 through the connections provided for that purpose, the bar 27 may be pushed downwardly whenever desired, thereby pulling upon lever 22 to contract the brake band 7 around the drum 6. During this contraction, yielding of the springs 15 and 21 takes place as above set forth and these springs come into play, together with the spring 26, to again open the band and entirely free it from the drum when the brake is released. Attention is directed to the fact that the brake may be applied or released regardless of the angle at which the wheels of the machine stand and that steering is in no manner affected by use of the brake, due to the novel association of parts above set forth.

Excellent results have been obtained from the several features shown and described and I therefore prefer to follow these features. It will be understood however that within the scope of the invention as claimed, numerous minor changes may be made.

I claim:

1. An automobile brake for a knuckle carried wheel comprising a drum for attachment to the wheel, a brake shoe for coaction with said drum, means for connecting said shoe with a non-rotating part of the chassis, including a pivot for axial alinement with the knuckle pivot and means for operating said brake shoe, including a pivot in axial alinement with the aforesaid pivot.

2. An automobile brake for a knuckle carried wheel comprising a drum for attachment to the wheel, a brake band surrounding said drum, a radius rod for attachment to a fixed part of the chassis, and a pivotal connection between said radius rod and said brake band adapted for vertical alinement with the knuckle pivot.

3. An automobile brake for a knuckle carried wheel comprising a drum for attachment to the wheel, a brake band surrounding said drum, a V-shaped radius rod whose ends are adapted to be pivoted to the chassis frame for vertical swinging, and a universally movable connection between the crotch portion of the radius rod and the upper side of said band adapted for vertical alinement with the knuckle pivot.

4. A structure as specified in claim 2, together with a connection extending from the radius rod to the automobile axle, including a spring yieldably supporting said rod.

5. An automobile brake for a knuckle carried wheel comprising a drum for attachment to the wheel, a brake shoe for coaction with said drum, an operating member for said shoe below said drum, and connecting means between said operating member and the shoe including a pivot for vertical alinement with the knuckle axis.

6. An automobile brake for a knuckle carried wheel comprising a drum for attachment to the wheel, a brake band surrounding said drum, a vertically movable lever connecting the ends of said band at the lower side of the drum, a vertically movable member for rocking said lever, and a connection between said lever and member movable on horizontal and vertical axes.

7. An automobile brake for a knuckle carried wheel comprising a drum for attachment to the wheel, a brake shoe for coaction with said drum, and a carrier for said shoe adapted to be secured to the knuckle, whereby to insure turning of the shoe with the wheel and drum when turning, said carrier including shoe engaging elements movable toward and away from each other and each yieldably held against sliding movement in one direction.

8. An automobile brake for a knuckle carried wheel comprising a drum for attachment to the wheel, a brake band surrounding said drum, and a band carrying-rod adapted to be secured to the knuckle, and band engaging elements slidably carried by said rod and yieldably held against movement toward each other.

9. An automobile brake for a knuckle carried wheel comprising a drum for attachment to the wheel, a brake band surrounding said drum, a band-carrying rod adapted to be secured to the knuckle, and spring projected sleeves surrounding the ends of said rod and connected to said band.

10. An automobile brake for a knuckle carried wheel, comprising a drum for attachment to the wheel, a brake band surrounding said drum with its ends positioned at the lower side thereof, a radius rod having a ball and socket connection with the upper side of said brake band, said radius rod being adapted for pivotal connection to the chassis frame of the machine, a spring-extended band-carrying rod having a portion adapted to be secured to the knuckle, the ends of the rod being connected with the band, a vertically movable lever connected with the ends of said brake band for contracting the same, a vertically movable member for operating said lever, a connection between said member and lever having both horizontal and vertical pivotal axes, the vertical axis being adapted for alinement with the knuckle axis and the vertical axis of said ball and socket connection, a rock shaft and means for mounting it on the axle of the machine, a crank arm on the rock shaft connected to said vertically movable member, and means for turning said rock shaft.

11. The structure as specified in claim 10; together with a yieldable support for the outer end of said radius rod.

12. An automobile brake for a knuckle carried wheel comprising a drum for attachment to the wheel, a brake shoe for coaction with said drum, means for holding said shoe against rotary movement upon said drum and having pivoted connection with the shoe with the said pivot in the plane of the brake shoe and in axial alinement with the knuckle pivot to permit turning of the shoe with the drum when the wheel turns for steering, and actuating means for said brake shoe.

13. An automobile brake for a kunckle carried wheel comprising a drum for attachment to the wheel, a brake shoe for co-action with said drum, a brace for said shoe adapted to be pivotally connected with a fixed part of the automobile for vertical swinging movement and having pivotal connection with said shoe, means for yieldably holding the shoe bracing means against vertical movement in one direction and actuating means for said shoe.

14. The structure of claim 13 having the pivot connection between the brace and shoe positioned in axial alinement with the knuckle pivot of the wheel and the shoe actuating means including a vertical pivot in axial alinement with the knuckle pivot of the wheel to permit turning of the shoe with the drum when the wheel is turned for steering.

In testimony whereof I have hereunto affixed my signature.

ARTHUR HUBALEK.